Feb. 5, 1957 M. E. WASILISIN ET AL 2,780,716
CORE MANUFACTURE
Filed Sept. 21, 1955 8 Sheets-Sheet 1

Fig. I.

INVENTOR
MICHAEL E. WASILISIN
DONALD E. WERNZ
BY Julian C. Renfro
ATTORNEY

Feb. 5, 1957    M. E. WASILISIN ET AL    2,780,716
CORE MANUFACTURE

Filed Sept. 21, 1955    8 Sheets-Sheet 2

INVENTORS
MICHAEL E. WASILISIN
DONALD E. WERNZ
BY Julian C. Renfro
ATTORNEY

Feb. 5, 1957 M. E. WASILISIN ET AL 2,780,716
CORE MANUFACTURE
Filed Sept. 21, 1955 8 Sheets-Sheet 8

INVENTORS
MICHAEL E. WASILISIN
DONALD E. WERNZ
BY Julian C. Renfro
ATTORNEY

United States Patent Office 2,780,716
Patented Feb. 5, 1957

2,780,716

CORE MANUFACTURE

Michael E. Wasilisin and Donald E. Wernz, Baltimore County, Md., assignors to The Glenn L. Martin Company, Middle River, Md., a corporation of Maryland Application September 21, 1955, Serial No. 535,638

7 Claims. (Cl. 219—83)

This invention relates to an improved method of seam-welding corrugated metallic foil sections together to form honeycomb core having symmetrical cells, and to the machine for carrying out this method.

In the past, metallic honeycomb core has been extensively used in the construction of airplanes and similar applications where weight is an important factor. The core material in most instances has been constructed of corrugated aluminum foil sections assembled into a honeycomb-like structure, with abutting valleys and crests of adjacent sheets bonded together by a thermosetting adhesive to form a series of cells between the sections. The adhesive, when hardened or set, will bond the corrugated sections into a cellular core having considerable strength.

This type of core has been used frequently in aircraft wings, tail surfaces, and flooring. For application in wings, for instance, the core is first shaped such as by the use of a band saw, into a substantially airfoil-shaped cross-section, having vertically extending cells. The shaped core is then covered with the upper and lower skins of the wing, with the cells of the core residing in a vertical arrangement and extending between the skins. A thermosetting adhesive such as FM-47 is used to bond the skins to the core material. The constituents of the wing structure are assembled in the proper relationship in what is known as a "bonding fixture" and in this fixture, the wing components are subjected to heat and pressure to cause the adhesive to set and thereby bring about the formation of a unitary structure.

For operations in which no substantial temperature is involved, the above-described bonded aluminum core has proven quite satisfactory. When high temperature and stress conditions are to be encountered, however, it becomes necessary to employ core whose foil sections are made of alloy steel, titanium and its alloys, or corrosion-resistant type alloys. Such foil sections would preferably be seam-welded together.

Although it is becoming increasingly desirable in the aircraft industry to employ honeycomb core made of high strength material, the production of such core has lagged considerably. This is principally due to the fact that it has been very difficult to maintain the alignment of the corrugations of two adjacent sections of foil so that the abutting apices of the sections, i. e., the valleys and crests, can be welded together to form symmetrical honeycomb cells. Also, it has been difficult to dissipate satisfactorily the heat added to the core during a resistance welding operation so that burning of the core will be entirely prevented.

In an attempt to circumvent the difficulties encountered in the welding of preformed corrugated steel sheets, alternative procedures have been proposed. For example, one procedure has been to construct the core from flat metal sheets that have been spot-welded along spaced parallel lines and then separated to form the expanded-cell type of cellular core. Such a procedure is not only painstaking and slow, but also results in nonuniform cells of irregular placement. Further, in order that the sheets can be satisfactorily separated so as to form the expanded-cell type of core, it is necessary to use sheets of annealed material.

In contrast with the expanded-cell type of core, according to the present invention core can be made from corrugated metal foil at a reasonably rapid rate. The resulting cells are quite symmetrical in size and placement, and if desired, can be made of almost perfect hexagonal configuration. Also, by using the present invention, core can be made of hardenable materials, of the type which could be hardened either by heat treatment or by cold working. Because of the regularity of the cells and the greater strength of the materials involved, the instant core has substantially greater strength qualities than are present in the expanded-cell type of core.

A plurality of elongated fingers of conductive material are used to support the corrugated metal foil sections during the seam-welding operations, and these fingers form one of the electric terminals of the welding machine. The fingers not only maintain the apices of adjacent sections of corrugated foil in alignment, but also conduct away heat from the core to keep it from overheating.

An object of this invention is to provide a method by which honeycomb core having cells symmetrical in size and placement can be constructed rapidly from preformed corrugated members.

A more specific object of this invention is to provide a method by which valleys and crests of adjacent corrugated metal members can be placed in abutting, aligned relationship and then seam-welded together so as to form a core having cells symmetrical in size and placement.

Another object of this invention is to provide a seam-welding machine by means of which the valleys and crests of adjacent corrugated metal members may be maintained in alignment and then seam-welded so as to form a core having cells symmetrical in size and placement.

Another object of this invention is to provide a method and a machine for carrying out the method by which honeycomb core having cells symmetrical in size and placement can be rapidly constructed from preformed corrugated members of hardenable metal.

The method according to this invention can comprise the steps of placing a section of corrugated metal foil on a set of spaced, substantially horizontally disposed fingers of electrically conductive material, so that the lower portions of the corrugations extend down between the fingers while the upper portions of the corrugations rest upon the fingers. A second set of electrically conductive fingers are placed so as to rest in the lower portions of the corrugations of said section, and a second section of corrugated metal foil is placed on the said second set of fingers so that the lower portions of said second section are in alignment with and contacting the upper portions of said first-mentioned section. An electrical terminal is placed in at least one lower portion of said second section of foil at a location directly above at least one of the fingers of the first-mentioned set, and is moved along said lower portion substantially in alignment with the longitudinal axes of the respective finger of said first-mentioned set. Simultaneously, an electric current is passed between said terminal and said finger through both sections of foil whereby to seam-weld abutting portions of said first and second sections together.

In order to secure the corrugated metal sections together at each abutting location so as to form a series of cells between these sections, the terminal is successively moved along each of the remaining lower portions of said second section, substantially in alignment with the longitudinal axis of a respective finger, while electric current is passed through both sections of foil to bring about the seam-welding operation.

Other sections of corrugated metal foil can be added to the now-welded structure according to this invention. In order that this may be done, the fingers of said first-mentioned set are removed from below said first mentioned section of foil and then placed in the lower portions of said second section, and then a third section of corrugated foil is placed on the fingers of said first-mentioned set so that the lower portions of the corrugations of said third section of foil are aligned with and contacting the upper portions of the corrugations of said second section of foil. The electric terminal is then successively moved along each of the lower portions of said third section of foil while electric current is passed between said terminal and said second set of fingers to weld the abutting portions of corrugations of said second and third sections together throughout the length of the sections. The core can be built up to the desired thickness by welding on additional sections of corrugated foil to create additional series of cells.

A seam-welding machine according to this invention can comprise a movable foil-supporting carriage and a welding carriage movable above said supporting carriage in a direction transverse to the direction in which said supporting carriage moves, and in a plane substantially parallel to the plane in which said supporting carriage operates. The supporting carriage has a plurality of aligned, spaced notches or serrations in a transverse arrangement across the upper portion thereof, and each of the serrations is adapted to receive an elongated finger of electrically conductive material. A plurality of these fingers, when placed in a closely spaced parallel arrangement in said serrations, forms a support for a first section of corrugated foil.

The welding carriage is movable in a direction substantially parallel to the longitudinal axes of the said fingers, and has a plurality of welding electrodes. Each of said electrodes, when fingers of the supporting carriage have been moved into vertical alignment therewith, is adapted to move along a corrugation of a second corrugated foil section whose lower corrugations are aligned with and resting upon the upper corrugations of the first foil section.

Each of the electrodes and its respective finger is connected to respective output terminals of a source of electric current having a pair of output terminals. By this arrangement, electric current can be caused to flow between each electrode and its respective finger, through both sections of foil resting on said supporting carriage, to seam-weld together the abutting corrugations resting below each electrode to form a series of cells between said foil sections.

Alternatively, the seam-welding machine can employ two sets of fingers, the fingers of each set being affixed in spaced relation in a support bar. By this arrangement, the use of a support carriage having a serrated upper portion can be obviated, for each finger of each set derives its support from its support bar.

Other objects, features and advantages of this invention will be apparent from the following detailed description and the accompanying drawings of illustrative embodiments of the invention.

Figure 1:
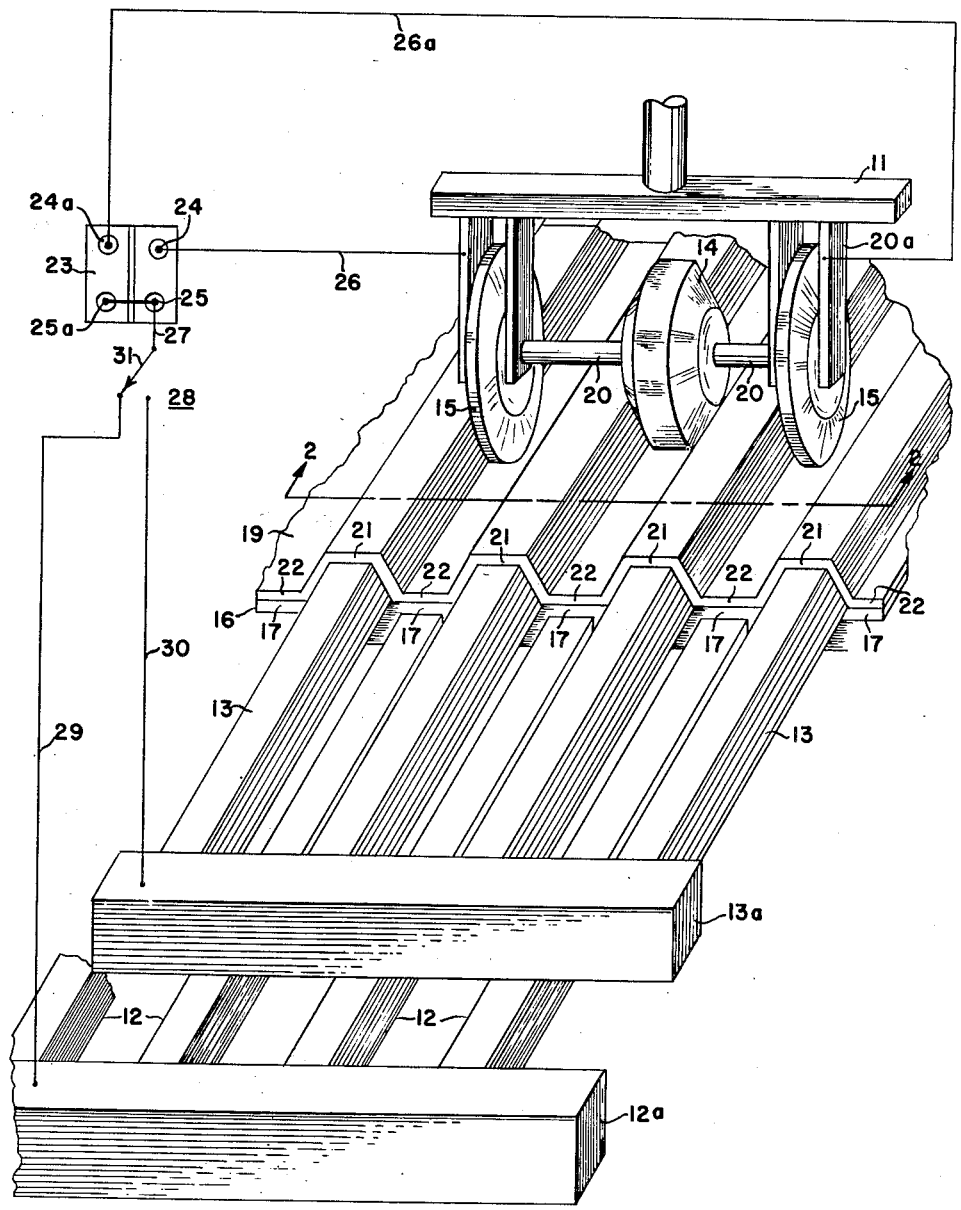
Fig. 1 is a perspective view of one embodiment of a seam-welding machine.

In Fig. 1 is illustrated an exemplary seam-welding machine 10 having a carriage 11 and two sets of metal fingers 12 and 13. Each set of fingers 12 and 13 is rigidly secured in a respective mounting bar 12a or 13a so that each set of fingers may be moved as a unit. Carriage 11 is made of non-conducting material and is movable generally in the direction of the longitudinal axes of these fingers and over the entire length of the fingers. Copper arms 20a are secured on the lower side of each end of the carriage, and these serve as mounting means for the two welding wheels or discs 15, which are preferably of copper. Each disc 15 is mounted on an individual axle member 20, and each axle member is rotatable in its respective arm 20a. The inner ends of the axle members are not in contact, and these ends are affixed in non-metallic guide wheel 14. A separate source of welding current is connected to each arm 20a, so that each welding disc can perform a seam-welding operation independently of the other disc. Although two discs have been used on the instant machine, it is to be understood that one, three or even a larger number of discs may be used satisfactorily.

The bars 12a and 13a may be supported by any desired means so that the fingers will be substantially horizontally disposed, and for clarity, no supporting means for these bars have been shown in Fig. 1. Each set of fingers can be mounted below one edge of the respective mounting bar, or alternatively, recesses can be provided in the upper and lower edges of these bars, between the fingers mounted therein, so that there will be no interference with the placing of the fingers in the closely arrayed, interfitting relationship shown in Figs. 1 through 4.

According to this invention, resistance welding techniques can be employed to seam-weld a plurality of corrugated metal foil sections together to form a honeycomb core. That seam-welding may satisfactorily be done upon corrugated foil, one set of fingers is employed as the lower electrode of the resistance welding machine, while the other set of fingers is acting as the aligning means for maintaining the apices, i. e., valleys and crests of adjacent foil sections, in aligned relationship that they may be satisfactorily welded together when the welding discs are moved along the corrugations. Since it is usually preferable to manufacture honeycomb core that has hexagonal or almost-hexagonal cells, the fingers 12 and 13 are substantially hexagonal in cross-section. Because of this, it is necessary to use foil that previously has been corrugated so as to have three-sided or "half hexagonal" corrugations, so that the foil can fit closely over the set of fingers that are used to support it. When the first foil section 16 has been correctly placed upon fingers 12 in the manner shown in Figs. 1 and 2, it fits closely over all of the fingers of the set with the upper portions or crests 17 of the corrugations resting upon the upper surfaces of the fingers and the lower portions or valleys 18 extending down between the fingers.

Figure 2:
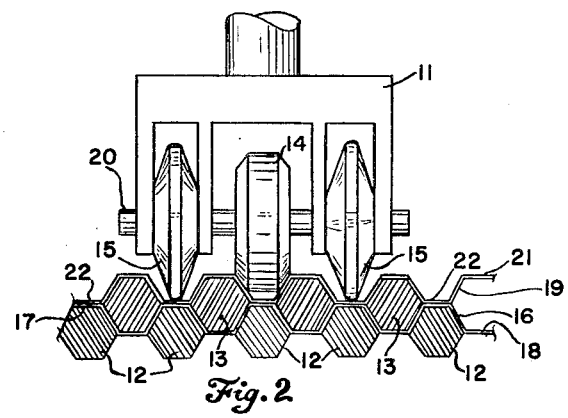
Fig. 2 is a sectional view of the machine of Fig. 1 taken along section line 2—2.
Figure 3:
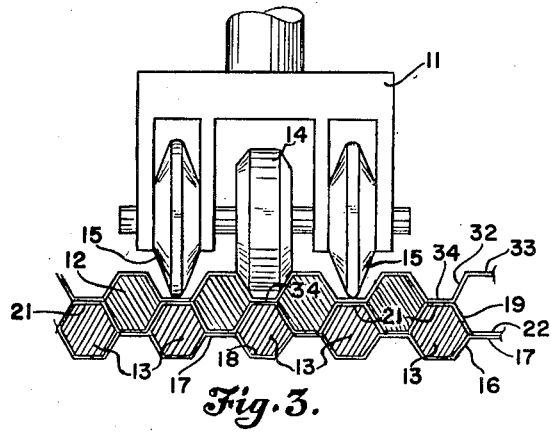
Fig. 3 is a sectional view similar to that of Fig. 2 but with another foil piece added to the core.

In order that foil section 16 can be held closely against fingers 12, the set of fingers 13 (also of hexagonal cross-section) are placed so as to rest in the valleys 18 of foil section 16 in the manner shown in Figs. 1 and 2. A second section of corrugated foil 19 then is placed upon fingers 13 in such a manner that the crests 21 of this section fit closely against the upper surface of fingers 13 and the valleys 22 extend down between the fingers so as to abut the crests 17 of foil section 16. Welding carriage 11 is now placed upon foil section 19 in the manner shown in Figs. 1 and 2 with the guide wheel 14 resting in one of the valleys 22 and the welding discs 15 resting in valleys on either side of the valley in which the guide wheel rests. By this arrangement, the fingers 12 form a firm support for both sections of foil so that the weight of the welding carriage can press the abutting portions of the two foil sections tightly together that they may be satisfactorily welded.

In the arrangement of the first and second foil sections shown in Fig. 2, the fingers 12 form the lower electrodes, and the welding discs 15 form the upper electrodes. The discs 15 are spaced sufficiently far apart that they do not rest in valleys that are immediately adjacent, but rather in valleys that are separated by an intermediate valley. The discs are spaced in this manner inasmuch as it is not desirable that a seam-welding operation be performed simultaneously in two adjacent valleys. Otherwise, the core might become overheated or the welding currents might be induced to deviate from the straight vertical path between a welding disc and its respective finger. The guide wheel 14 travels in the intermediate valley, and this wheel as previously mentioned, is made of a non-conducting material such as a phenolic or plastic material.

As shown in Fig. 1, a source 23 of electrical energy is provided for the welding operation, and output terminal 24, 24a and 25, 25a carry the electrical potential from which the welding energy is derived. Terminals 25 and 25a are joined together inasmuch as both are to be connected at the same time to a set of fingers. Terminals 24 and 24a are at a different potential with respect to the terminals 25, 25a, and each of the terminals 24 and 24a are connected separately to one of the carriage arms 20a. Flexible leads 26 and 26a are connected to terminals 24 and 24a, respectively, and the other end of each lead is connected to an arm 20a. Lead 27 connects the common terminals 25, 25a to movable arm 31 of a switch 28. Fexible leads 29 and 30 join terminals of switch 28 to the lower and upper sets of fingers 12 and 13, respectively, so that by the placement of the arm 31 of the switch, one or the other of the sets of fingers can be electrically connected to the terminal 25, 25a.

In the arrangement illustrated in Fig. 1, there is a difference of electric potential between each of the welding discs 15 and the lower set of fingers 12, inasmuch as arm 31 of switch 28 is so placed that the fingers 12 are connected to terminals 25, 25a. Because of this difference in potential, current is induced to flow between each disc 15 and the finger 12 that is directly below each disc, the current necessarily flowing through both sections of corrugated foil and causing them to be welded together. During the welding operation, the carriage 11 is moved along the uppermost foil section 19 with the welding discs 15 rolling along the valleys 22 of this section, substantially in alignment with the direction of the longitudinal axes of the fingers 12. The guide wheel 14 assists in maintaining the discs traveling in a true course along the valleys.

In Fig. 1, after the valleys 22 that are directly beneath the discs 15 have been welded to the respective crests of foil section 16, the carriage 11 is then moved or indexed so that all of the remaining valleys of foil section 19 can be welded to the crests of foil section 16 by the passage of welding current between the discs 15 and the fingers 12. When all of the abutting valleys and crests of section 16 and 19 have been seam-welded, a new section of corrugated foil can then be added. The carriage 11 is removed from the position directly above foil section 19 and fingers 12 are removed from below section 16. Fingers 12 are then placed in the valleys 22 of section 19 in the manner illustrated in Fig. 3, the fingers 13 supporting the now-welded core structure. A new section of corrugated foil 32 is then placed so as to rest closely upon fingers 12 with the valleys 34 of this foil section extending down between fingers 12 so as to rest in abutting relationship with the crest 21 of foil section 19. The carriage 11 is now placed in welding position so as to rest on foil section 32, the welding discs 15 and the guide wheel 14 each resting in a valley 34. The contact arm 31 of switch 28 is now shifted so as to be in contact with the terminal of lead 30, thereby causing the fingers 13 to become the lower electrode. The third section of foil 32 is now to be seam-welded to the second foil section 19 so as to form a series of hexagonal cells between these two sections of foil, this being accomplished according to the above-described procedure. It should be noted that the downward forces applied by the discs 15 in order to bring the abutting valleys and crests into good contact for welding is borne by fingers 13, and therefore is not dissipated through the core structure. Accordingly, there is little limitation on the number of corrugated foil sections that may be added according to this invention.

Figure 4:
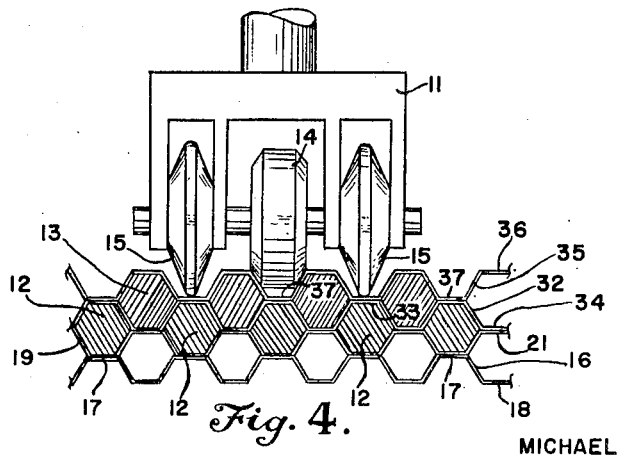
Fig. 4 is a sectional view similar to that of Figs. 2 and 3, but with still another foil piece added to the core.

Fig. 4 illustrates the manner in which a fourth section of foil 35 can be welded onto the existing core. In this figure, the fingers 13 have been removed from their previous position beneath foil section 19 and placed in the valleys 34 of foil section 32. Foil section 35 is then placed on top of fingers 13 with the valleys 37 of this section abutting crests 33 of foil section 32. The welding carriage 11 is then placed on top of section 35, and this section of foil seam-welded to foil section 32 according to the above-described procedure.

Although the fingers of sets 12 and 13 have been described as being preferably of hexagonal cross-section, it is to be understood that fingers of other configuration may be used so that core material having cells of a shape other than hexagonal may be made. For example, the upper and lower surfaces of the fingers can be oval, almost square, or somewhat of sine wave configuration. In such event, the foil used will be corrugated in such a manner that it can rest closely against the fingers. The fingers are preferably of copper so that they will rapidly conduct the heat produced by the welding operation away from the foil sections thereby eliminating overheating of the core. There may be a large number of fingers in each set of fingers so that core material may be made of substantial length. In place of discs 15, various other types of devices may be employed. For instance, sliding contacts may be used, or gears having a close array of small teeth that will produce overlapping spot welds (i. e., a seam-weld) may be employed.

As previously mentioned, core material constructed from aluminum foil has been quite satisfactory in the past when used in the construction of airplane components, such as in wings. However, as aircraft speeds continue to increase beyond the speed of sound and penetrate more and more into the "thermal barrier," it becomes desirable to have the core material constructed of metals having better capabilities at higher temperature than does aluminum, which shows little promise for structures that are to be used at raised temperatures. Although a number of alloy steels and corrosion-resistant type alloy steels have satisfactorily been made into honeycomb material according to this invention, a precipitation hardening stainless steel known as 17–7PH, which is manufactured by the Armco Company of Middletown, Ohio, has been the most satisfactory.

In the annealed state, the structure of 17–7PH stainless steel is predominantly austenite with lesser amounts of ferrite. This steel is unique in that transformation from the austenite can be accomplished after reheating in the range of 1200°–1700° F. During such reheating, precipitation from the austenite affects the composition of the steel to the extent that transformation on cooling now starts at approximately 200° F. and is sufficiently complete upon cooling to 60° F. that it possesses desired properties. Transformation is accompanied by an increase in strength and hardness. 17–7PH stainless steel can readily be welded by resistance welding, and excellent mechanical properties can be obtained in weldments. When this steel is welded after the transformation treatment, it is not susceptible to cracking because steel of this low carbon content does not transform to martensite as a result of welding.

The 17–7PH foil is received in the annealed condition and is transformed by heating it to approximately 1400° F. for approximately one and one-half hours and then cooling it to below 60° F. According to the preferred procedure, the foil is then aged at approximately 1050° F. for approximately one and one-half hours, and then after cooling, successively apertured, corrugated, cut into sections of desired length, and then welded into a cellular core according to the above-described method. Alternatively, the foil can be aged before it is corrugated or after it has been welded into honeycomb core.

The foil is apertured by piercing or perforating substantially in accordance with the patent to Theodore P. Pajak, No. 2,609,068, issued on September 2, 1952, which is assigned to the assignee of the instant invention. In honeycomb core, these apertures provide passages leading from cell to cell and outwardly of the core structure, and are necessary in order to liberate the vapors formed in the cells when the honeycomb core is bonded or brazed between two sheets to form a sandwich structure. After the foil has been apertured, it is corrugated by passing it through a corrugating machine in the nature of the machine described and claimed in the Engel et al. patent, No. 2,609,314, issued on September 2, 1952, and assigned to the instant assignee. Preferably the foil is pierced by a rotary piercing machine that is operating in juxtaposition with the corrugating machine. Flat foil is fed into the piercing machine and goes directly therefrom into the corrugating machine, and emerges from latter machine in a form that is ready to be welded into honeycomb. Alternatively, the foil can be corrugated by use of a die fitted in a pressbrake or punch press, but this is a much slower procedure.

In addition to 17-7PH stainless steel, other alloy steels such as AM350, AISI302, or AISI321 can be successfully used. In addition to steels, other high strength materials such as titanium can be utilized to make honeycomb core according to this invention. In the event that titanium is to be used, the seam-welding of corrugated titanium foil sections might preferably be done in an inert atmosphere, such as an atmosphere of argon or helium. The foil used has ranged in thickness between .0007" and .006", with .003" foil usually being the most suitable thickness for stainless steel foils.

Figure 5:
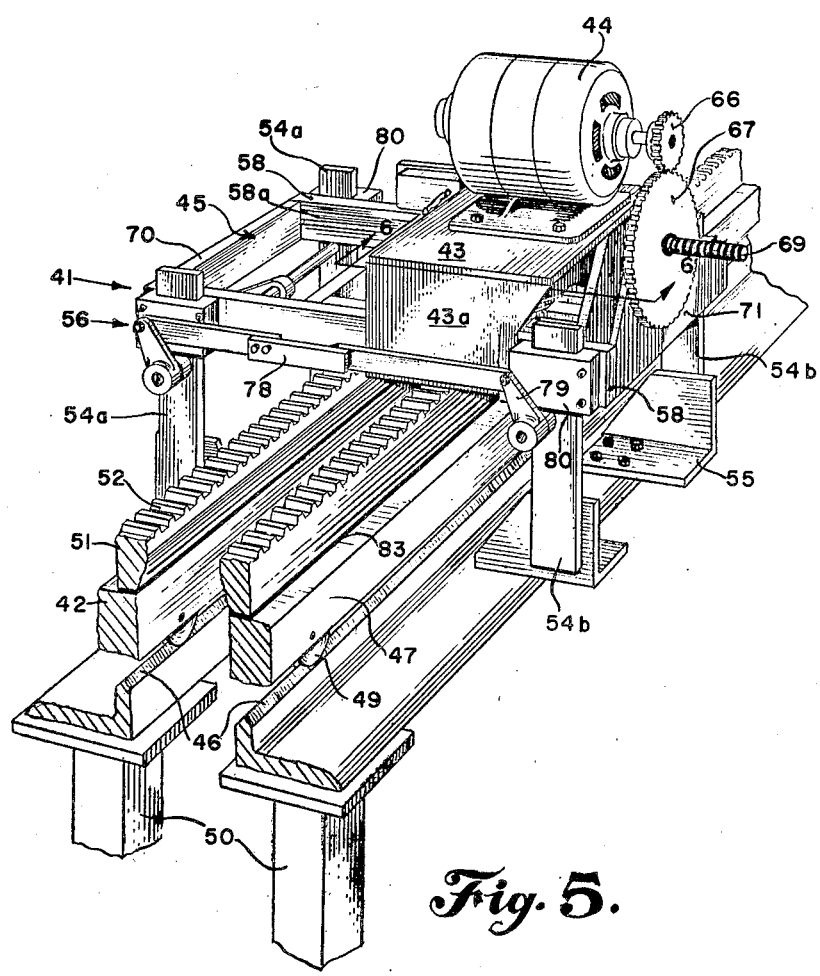
Fig. 5 is a perspective view of a preferred embodiment of a seam-welding machine.

Fig. 5 illustrates a preferred embodiment of a seam-welding machine according to this invention. This machine is generally identified by numeral 41, and principally consists of a movable carriage 42 of substantial length, a motor support 43 that supports driving motor 44, and a support frame 45 for a welding carriage. Motor support 43 has two legs 43a which are bolted directly to support frame 45. Carriage 42 is arranged to carry the sections of corrugated foil that are to be made into honeycomb core, and this carriage travels back and forth below the welding carriage support frame 45 upon horizontal rail members 46.

The rail members 46 are mounted upon support members 50 so that the rail surfaces will be spaced above the floor, this being done to permit honeycomb core of substantial dimension to be built up on this machine. A number of small wheels 49 are rotatably mounted at spaced locations along the bottom of carriage 42, and are so placed that the wheels will roll along the rail surfaces as the carriage is moved back and forth with respect to the support frame 45.

Carriage 42 principally consists of two spaced bars 47 joined together at each end by a spacer bar 48. Atop each of the bars 47 is a copper bar 51 that is similar in size and length to the bar 47 to which it is secured. The copper bars 51 will hereinafter be referred to as bus bars. Along the top of the bus bars are a number of aligned, spaced notches or serrations 52 that are adapted to receive the numerous fingers 53 that are to support the sections of corrugated foil. Fiber strips 83 are intermediate each bar 47 and its respective bus bar, and screws 84 that secure the bus bars to the bars 47 have fiber sleeves 85 and fiber washers 86. Nonconducting material is used in this manner so that the bus bars 51 will be electrically isolated from the rest of the machine.

Figure 8:
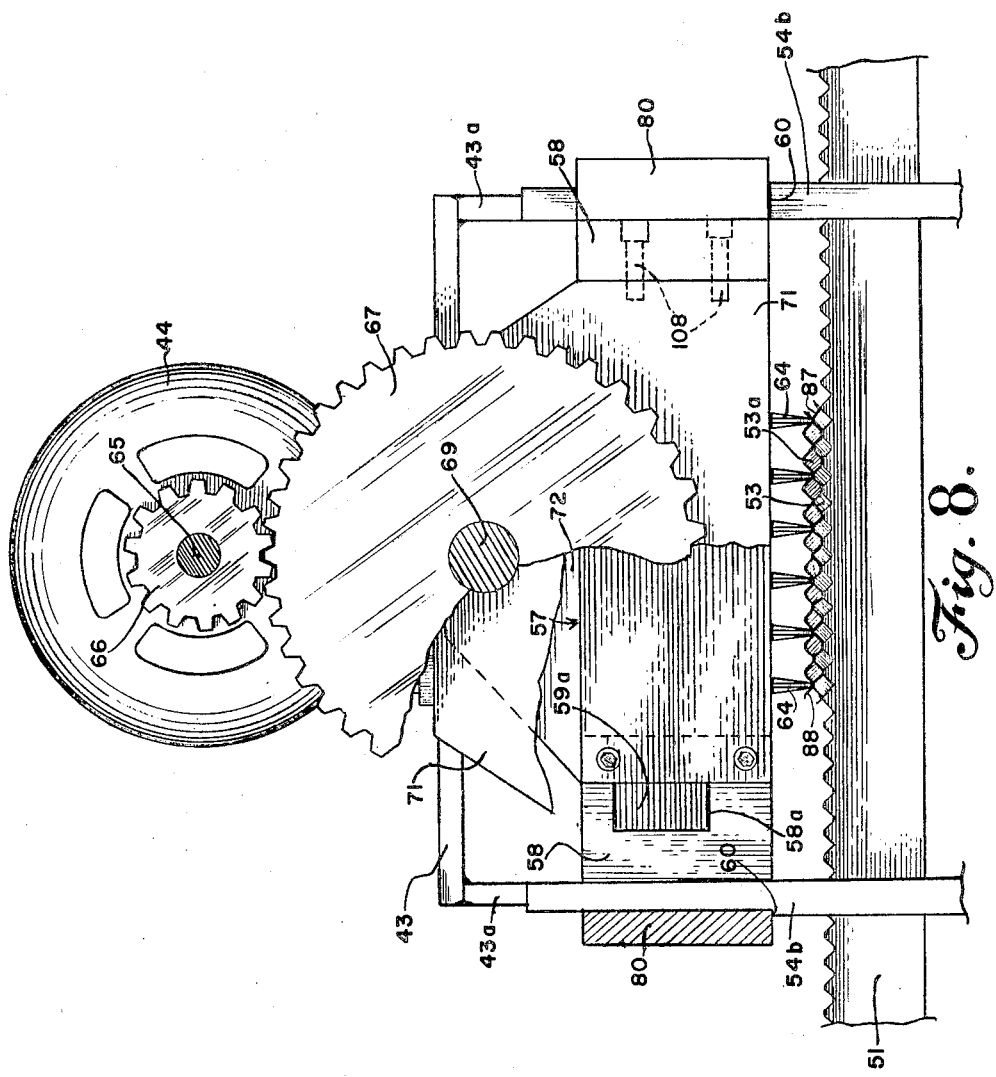
Fig. 8 is an end view of the machine shown in Fig. 6, this view being partly in section and drawn to a somewhat larger scale.

The fingers 53 are to be laid in a parallel arrangement across the bus bars, with one end of each finger resting on one of the bus bars 51. The serrations in one bus bar are aligned with the serrations of the other bus bar, so that when the fingers are placed with each end of each finger resting in a serration, there will be an orderly, parallel array of fingers along the top of carriage 42. A section of foil is then laid upon the fingers, the foil having been corrugated so that each of its corrugations will fit closely upon a finger. This is best seen in Fig. 8, wherein a short length of corrugated foil section 87 is shown resting upon fingers 53. A second set of fingers 53a is then laid on foil section 87 and a second section of corrugated foil 88 laid upon the second set of fingers, with the valleys of section 88 aligned with and abutting the crests of section 87. By movement of welding carriage 57, the welding discs or electrodes 64 can be caused to simultaneously roll across the uppermost section of corrugated foil, thereby to bring about the welding of the apices of the uppermost section of foil to the apices of the section directly beneath it, the welding current passing between each disc and the finger directly under the disc, through both foil sections.

Figure 6:
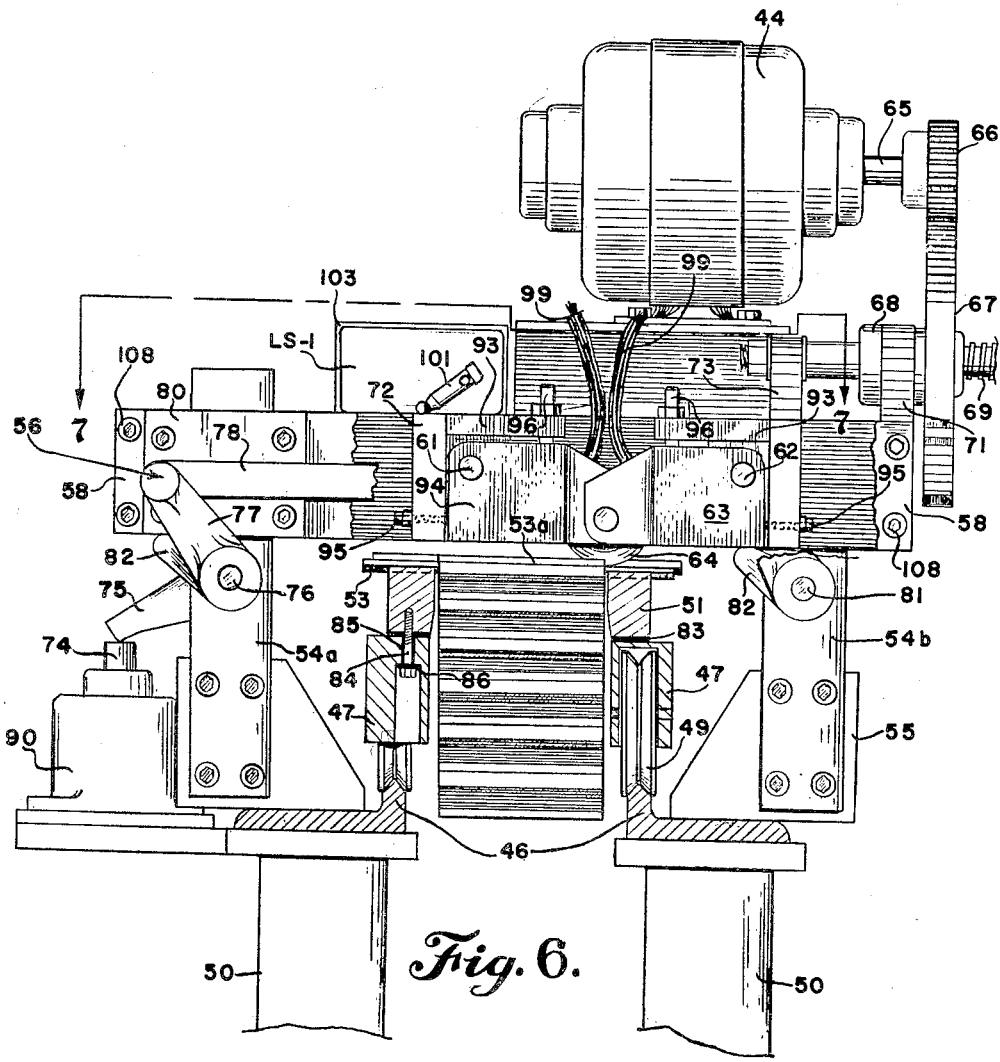
Fig. 6 is a side elevation view partly in section of the machine of Fig. 5, this view being taken along section line 6—6.

After all of the abutting apices of sections 87 and 88 have been seam-welded together to form an initial layer of cellular honeycomb core, one or more additional sections of corrugated foil can then be added to this core. To do this, the fingers 53 are removed from the position below foil section 87, allowing the newly-formed core to drop down somewhat until the fingers 53a come to rest in the serrations 52. The fingers 53 then are placed in valleys of section 88 to act as alignment means and then an additional section of corrugated foil (not shown) is placed upon section 88 in such a manner that the valleys of the new section are aligned with and abut the crests of section 88. The valleys of the new section then are seam-welded to the crests of section 88 by operation of the welding carriage 57. Additional sections of foil can be added in the same general manner, with the honeycomb core being built up between the bus bars 51. This is best seen in Fig. 6, where a core consisting of a number of sections that have been welded together is shown.

The welding carriage 57 rests in a welding carriage support frame 45, and is movable therein back and forth across the corrugated foil resting on carriage 42. The support frame 45 rests on four upright posts, the two posts 54a being located on the front side of the machine and the two posts 54b being located on the rear side. The posts are secured by angle members 55 to the rail members 46. The support frame 45 is movable vertically upon the upper ends of the posts, such movement being brought about on occasion by means of a linkage 56. Linkage 56 will be described in greater detail hereinafter, and suffice it to say that the support frame and welding carriage are periodically raised to permit the welding discs 64 of the welding carriage to clear the foil sections supported on carriage 42, that latter carriage can be indexed along rail members 46.

The support frame 45 has two side members 58, which are joined at their front end to member 70 and at their rear end to the member 71, by means of screws or bolts 108. Generally U-shaped brackets 80 are secured to the exterior sides of side members 58, and in these brackets, the ends of posts 54a and 54b are vertically slidable as the support frame is raised or lowered. Since the weight of the support frame is a consideration, the members 58, 70 and 71 are preferably made of a light metal such as aluminum, rather than of steel.

Figure 7:
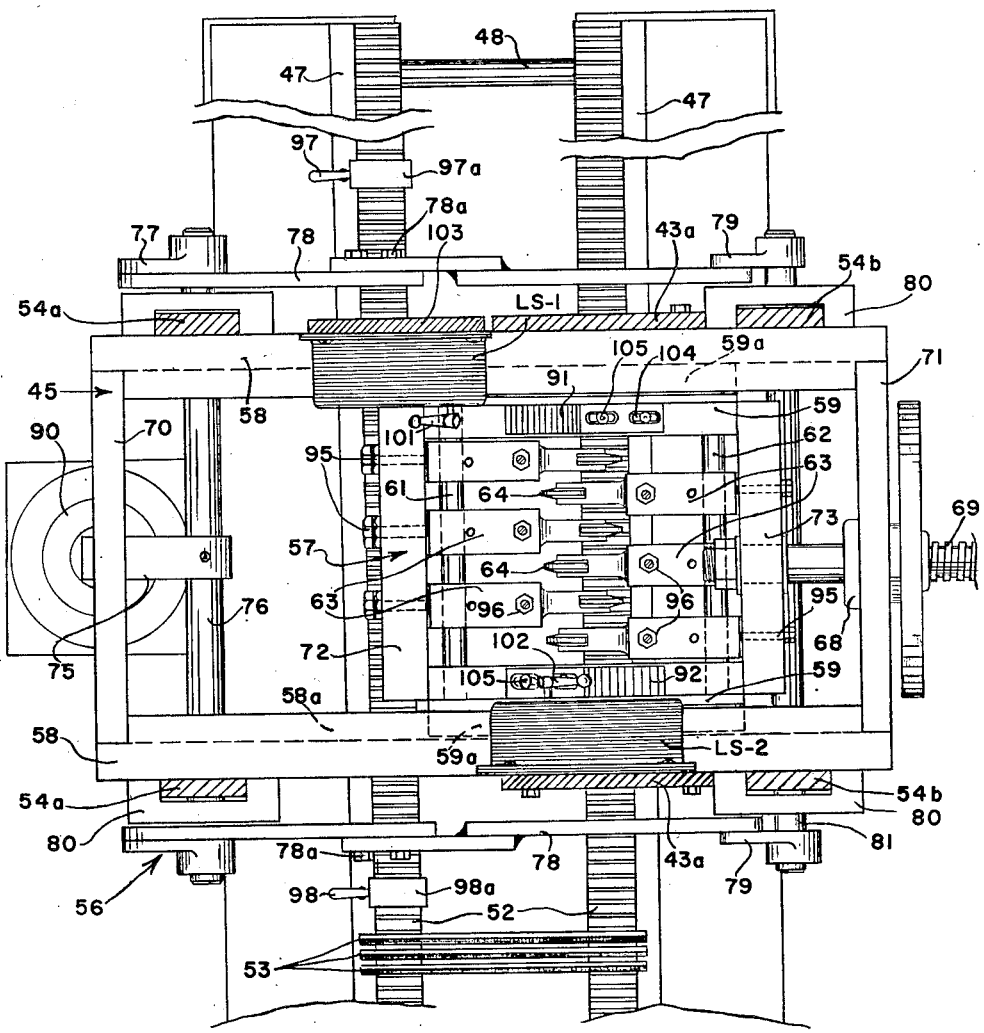
Fig. 7 is a plan view of the machine of Fig. 5 with the motor and motor mounting removed, this view being taken along section line 7—7 in Fig. 6.

Referring to Fig. 7, the welding carriage 57 rests intermediate the side members 58 of support frame 45. Formed in each side member 58 is a longitudinal slot 58a along which the welding carriage travels. Bearing members 59 form the sides of the welding carriage that are adjacent the members 58 of the frame and these are joined at front and rear by end members 72 and 73, respectively. These end members preferably are made of fiber or plastic. In cross-section, the members 59 of the carriage have somewhat of a T-shaped configuration. The leg 59a of each T is horizontally disposed, and is closely fitted in its respective longitudinal slot 58a. See Fig. 8. The arrangement is such that the welding carriage can slide virtually the length of frame 45, without any degree of sideways or "lost" motion with respect to the frame.

Located in the welding carriage are electrode support bars 61 and 62, which are of a nonconducting material such as polystyrene. Each support bar is non-rotatably supported at its ends by the members 59, and each bar supports a plurality of bus bars 63. Six bus bars 63 are preferably used in the instant machine, three being carried by each of the support bars and placed in overlapping relationship as illustrated in Fig. 7. Rotatably mounted on each of the busses is a welding disc or electrode 64. These six discs have aligned axes, and when the welding carriage is operated, these discs roll along the corrugations of the uppermost section of foil resting on carriage 42. The bus bars 63 are preferably spaced on their support bars a distance equivalent to the distance between two serrations 52. This is done because it is desirable for the discs 64 to rest in alternate valleys as shown in Fig. 8.

Figures 10, 10A:
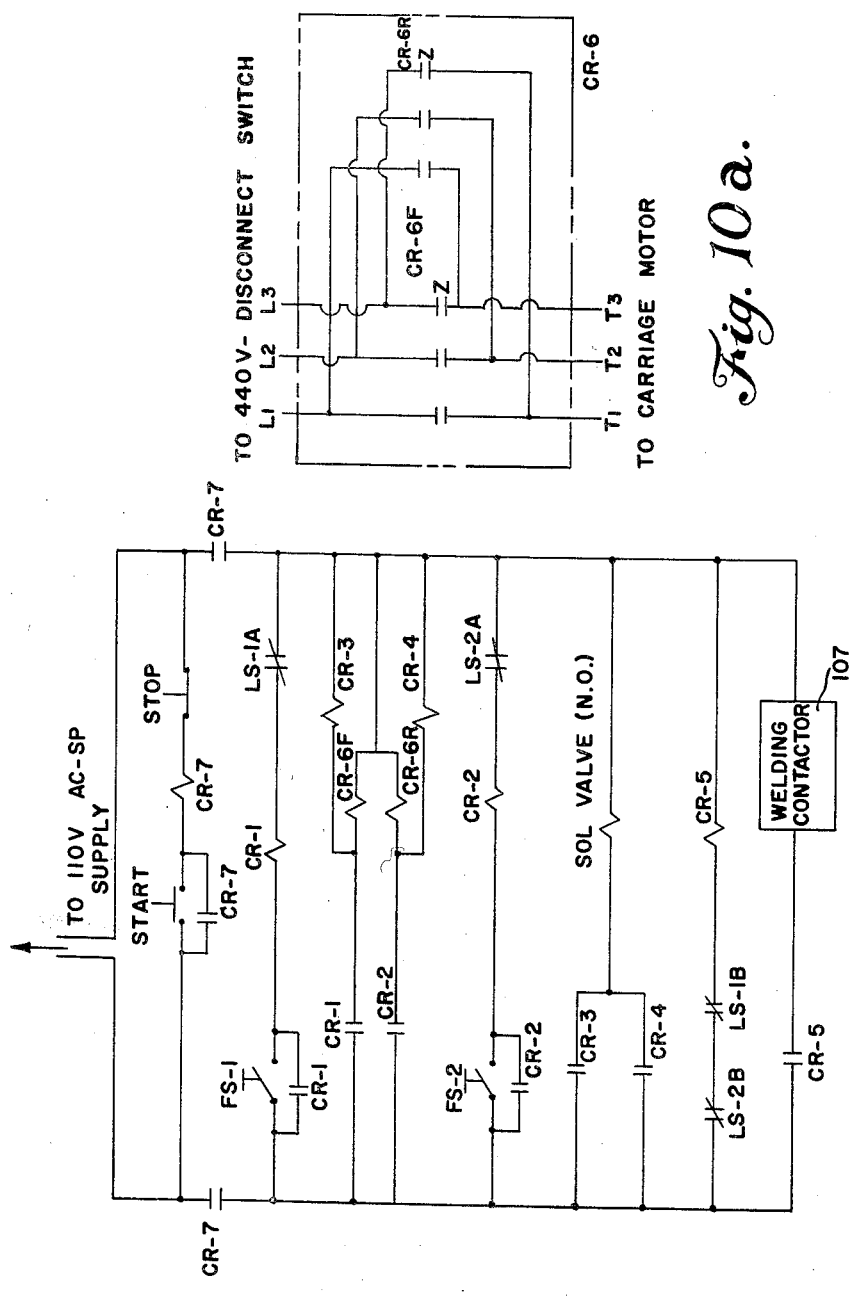
Fig. 10 is a schematic diagram of the control circuit of the welding carriage.
Figs. 10a is a schematic diagram of the reversing switch of the welding carriage motor.

So that two foil sections can be welded together by a current passing between the discs 64 of the upper busses and the fingers 53 resting on the lower busses 51, a resistance welding arrangement in the general nature of the one illustrated in Fig. 1 is provided. The lower bus bars 51 are electrically interconnected so as to be at the same potential level. These bus bars act as a common or ground connection for the fingers that are placed thereon, for when resting on the bus bars 51, the fingers are in intimate contact therewith. The upper bus bars 63 preferably are not connected to a common terminal, but rather each is connected to a separate power supply so that a desirable amount of current can be made to flow between each of the welding discs 64 and its respective finger. For instance, six transformers (not shown) can be provided, with one terminal of the secondary of each transformer connected to the lower bus bars 51, with the remaining terminal of the secondary of each transformer connected to one of the upper bus bars 63 by a cable 99. Because of this arrangement, there will be no occasion for a substantially different amount of current to flow between any one welding disc and its respective finger, and any other disc and its finger. However, a single transformer may be employed to supply the welding current for all the discs if such be desired. Welding contactor 107, shown in Fig. 10, is operatively connected to the switch responsible for connecting the primaries of the welding transformers across the line.

By the above described welding arrangement, seam welds (i. e., overlapping spot welds) can be performed at a normal rate that is two times the line frequency. In other words, if 60 cycle current is employed to energize the primaries of the welding transformers, spot welds will be performed at the rate of 120 welds per second.

Where other seam-weld spacing, or other welding rates are desired, conventional seam-welding control principles may be employed. As is well known in the welding industry, welding rates in many welding machines may be altered by varying thyratron grid control multivibrator rates. If it is desired to have an arrangement in which the voltage of the welding electrodes may be changed, saturable core reactors, resistances, or stored energy level systems may be used.

Each of the upper busses 63 is composed of two portions, an upper portion 93 that is tightly secured to its respective support bar 61 or 62, and a lower portion 94 which is rotatable with respect to the upper portion. The portions 93 and 94 of each bus 63 are interfitted and each portion has a hole therein so that both portions may be assembled onto a support bar. A set screw (not shown) is located in each upper portion 93 so that it can be locked to the support bar. This not only prevents the rotation of this portion, but also insures that the upper busses will not be accidentally displaced along the support bar. The lower portion 94 of each bus is rotatable around the support bar for a comparatively small number of degrees, and adjustment screws 95 threaded into end members 72 and 73 of the welding carriage make it possible to adjust the lowermost position each lower portion 94 can assume. A small spring (not shown) is fitted between each set of upper and lower members to bias the lower member downwardly, and by means of spring adjustment screw 96 located on each upper position 93, the spring pressure biasing the respective lower member downwardly can be regulated. A welding disc 64 is rotatably mounted upon each lower portion, and because of the spring bias, as each welding disc rolls along a corrugation of the foil, it presses tightly against the foil to such an extent that the abutting apices of the two foil sections will be placed in firm contact with each other and with the finger thereunder.

In the instant machine, the serrations 52 on the carriage 42 have been placed .414" apart, center-to-center. Carriage 42 is approximately 11' long, and the rails 46 approximately twice that length. Assuming there is about 10' of usable space along the top of carriage 42, approximately 290 fingers can be accommodated in serrations 52. (120" divided by .414"=290).

The fingers are preferably made of copper in 8" lengths, having a ¼" cross section. The fingers used in the instant machine have been altered into a "modified hexagonal" or "squarecell" cross-section by flattening each of the four corners of a square cross section to the extent of .060". The serrations 52 have been shaped to receive fingers of such configuration, and the foil to be used therewith is corrugated to fit closely over the fingers when the fingers are resting in the serrations. In Fig. 6 is shown a finger 53 resting across the bus bars 51, and in Fig. 7 a small number of fingers are shown residing in a parallel array upon carriage 42. As should be evident, the number of fingers used during the manufacture of honeycomb core is dictated by the length of core that it is desired to manufacture.

To accomplish the welding together of two corrugated foil sections, the welding carriage 57 is movable forwardly and rearwardly in the support frame 45 so that the welding discs 64 can be moved across the corrugated foil section in both directions. The moving of the welding carriage is accomplished by means of reversible motor 44, the shaft 65 of which is directly connected to a spur gear 66 located on the rear side of the machine. Meshing with gear 66 is a larger gear 67 whose hub or bushing 68 is internally threaded in order to receive threaded shaft 69. The hub 68 is located in end member 71 of support frame in such a manner that while it can rotate, it is restrained against longitudinal movement. Therefore, as the motor causes gears 66 and 67 to rotate, the hub 68 of gear 67 is likewise caused to rotate thereby to cause shaft 69 to move longitudinally. Depending on the direction of rotation of motor 44, the welding carriage can be caused to move either in the forward or in the return direction. Shaft 69 is bolted directly to end member 72 of the welding carriage, inasmuch as this shaft does not rotate.

As previously mentioned, linkage 56 is responsible for moving the welding carriage 45 up and down on posts 54a and 54b. An air cylinder 90 is located intermediate the posts 54a on the front side of the machine. See Fig. 6. Upon high pressure air being admitted to cylinder 90, piston 74 is caused to move upwardly so as to bear against and raise arm 75. Arm 75 is secured in the central portion of rod 76, this rod being rotatably mounted in posts 54a. Upon rod 76 being rotated by arm 75, it causes cranks 77 to rotate in a clockwise direction as viewed in Fig. 6, this causing bars or links 78 on each side of the welding carriage to move so as to bring about a similar rotation of cranks 79 which are secured to rotatably mounted rod 81. A cam 82 is located adjacent each of the cranks in such a position as to bear on the underside of the side members 59 of the welding carriage support frame, and cause this frame to raise whenever the arm 75 is actuated by air cylinder 90. In other words, upon air cylinder 90 being actuated, the entire support frame 45 is cause to move up the posts 54a and 54b, thereby permitting the carriage 42 to be moved to a new position underneath the welding carriage without interference from welding discs 64. One side of each of the posts 54a and 54b is provided with an undercut or shelf 60 (see Fig. 8) which prevents the welding carriage from dropping down too far on the posts. Adjustment screws 78a are located in the links 78 to permit the length of these members to be adjusted so that the ends of the support frame will be raised evenly.

Electrical circuitry is employed to control the reciprocation of the welding carriage 57 in support frame 45, to control the raising of the support frame, and to control the actuation of the switch or switches used to connect the bus bars 51 and 63 to the source of electricity. Normally-closed limit switches LS–1 and LS–2 are mounted on mounting plate 103 and one of the legs 43a of the motor support 43, respectively, as shown in Fig. 7. The switches LS–1 and LS–2 have switch arms 101 and 102, respectively. Cams 91 and 92 are mounted on the upper surfaces of bearing members 59 of the welding carriage, so that as this carriage nears the forward end of the support frame, limit switch LS–1 will be actuated by cam 91, and as the carriage nears the rear end, switch LS–2 will be actuated by cam 92.

Each cam has a tapered surface so that the arms 101 and 102 can be gradually raised or lowered as cam 91 or 92 moves toward or away from its respective switch arm. The cams have elongated slots 104 therein, through which extend mounting screws 105. The lower ends of these screws are threaded into members 59, and by loosening the screws, the cams can be moved to the desired position on the carriage. The screws 105 are then of course retightened to maintain the cams in the correct position on the welding carriage with respect to the limit switches.

The cams 91 and 92 should be so positioned that the motor 44 and the welding current will be shut off after the welding carriage has traversed the corrugated foil in either direction. For instance, when the welding carriage 57 moves toward the left as viewed in Fig. 7 (i. e., moves in the forward direction), the welding discs 64 move toward the left from the position shown in Fig. 6, along the corrugations of the uppermost section of foil so as to seam-weld the apices of this section to the apices of the foil section directly below it. Then, as the carriage 57 nears the front side of the support frame 45, the cam 91 moves under the arm 101 of limit switch LS–1, causing this arm to raise, and thereby open the contacts of switch LS–1. As later described in more detail, the opening of these contacts not only brings about the deenergizing of motor 44, but also deenergizes the welding contactor 107 to shut off the welding current flowing between each welding disc 64 and the finger 53 then under each disc. Further, the opening of the contacts of LS–1 bring about the deenergizing of normally-open solenoid valve 89, causing it to open and admit high pressure air to cylinder 90, which operates to raise support frame 45 so that carriage 42 can be indexed to a new position below the welding carriage. Solenoid valve 89 is an electrically operated solenoid air valve, of a type that is commercially available. It is a three way valve, so that when energized, it not only shuts off the flow of compressed air to cylinder 90, but also releases to the atmosphere the high pressure air contained in cylinder 90, so that the support frame can return to the lowered position.

The operator controls the movements of welding carriage 57 by means of foot switches FS–1 and FS–2, which are not shown except in Fig. 10, where these switches appear schematically. It is the closing of FS–1 that causes the welding carriage to move from right to left in the manner described above. When the welding carriage has come to rest in the raised position near the front side of the machine, and the carriage 42 indexed to a new position, the switch FS–2 is pressed to cause the carriage to perform a welding operation in the "return" or rearward direction. The closing of FS–2 causes the support frame to drop from this raised position into its lowered position, and the motor 44 to be connected so as to operate in the reverse direction. Such rotation of the motor causes the welding carriage 57 to move in the return direction, resulting in the cam 91 moving away from arm 101 of switch LS–1. This latter occurrence allows contacts of LS–1 to reclose, and thereby energize contactor 107 to bring about a flow of welding current between the discs 64 and the fingers now below the discs, through both sections of foil resting on the fingers. In each instance it is the closing of the foot switch FS–1 or FS–2 that causes the movement of the welding carriage and the dropping of the support frame 45, the resulting forward or rearward motion of the welding carriage causing the limit switch LS–1 or LS–2 to close and cause the welding current to commence.

Referring to Fig. 10, the wiring diagram illustrating the circuit of the welding carriage 57 is shown. This circuit is supplied from a conventional 110 volt single phase A. C. supply.

The detailed operation of the welding carriage is as follows:

1. The operator presses start button of switch 106, completing the circuit to the coil of control relay CR–7, causing this relay to be energized. The actuation of this relay causes holding contacts CR–7 to close across the start button to maintain a closed circuit, and also causes line contacts of relay CR–7 to close, thereby energizing the entire welding carriage circuit.

2. The operator presses foot switch FS–1 causing the coil of control relay CR–1 to be energized. (The circuit of relay CR–1 is completed through contacts LS–1A, which are normally closed.) CR–1 holding contacts then close across switch FS–1 to maintain a closed circuit, and other contacts of this relay close to energize control relays CR–6F and CR–3.

(a) The closing of relay CR–6F causes normally-open contacts of this relay to close in the circuit of motor 44, connecting this motor across the 440 volt 3-phase A. C. line. The contacts CR–6F are shown in the motor circuit, Fig. 10a. Motor 44 now operates in the forward direction, thereby causing the welding carriage 57 to commence movement transversely of carriage 42, upon which the corrugated foil sections are carried.

(b) The closing of relay CR–3 causes contacts CR–3 to close, completing the circuit to solenoid valve 89. Since the solenoid valve is normally open, upon being energized it causes the cessation of the flow of high pressure air to cylinder 90, thereby allowing welding carriage support frame 45 to drop downwardly so that the welding discs 64 can come into contact with the lower corrugations of the uppermost section of foil supported by carriage 42.

Since motor 44 has been placed across the line and is now turning, it commences to move the carriage in the forward direction. When the carriage has moved a comparatively short distance, cam 92 moves away from the position below the arm 102 of normally closed limit switch LS–2, allowing its contacts to close.

The closing of contacts LS–2B of switch LS–2 completes the circuit to control relay CR–5, causing it to be energized. Contacts of relay CR–5 close in the circuit of welding contactor 107, which causes welding current to flow between welding discs 64 and the respective finger that is under each disc, thereby performing the seam-welding operation.

Contacts LS–2A also close, which are contacts located in the circuit of control relay CR–2.

The welding carriage 45 continues moving across carriage 42, and ultimately cam 91 reaches the arm of limit switch LS–1, causing the arm to raise and to open the normally-closed contacts of this relay.

Contacts LS–1A open to deenergize relay CR–1, whose contacts open to deenergize relays CR–6F and CR–3.

The deenergizing of relay CR–6F causes the contacts CR–6F to open, stopping motor 44.

The deenergizing of relay CR–3 breaks the circuit to solenoid valve 89 allowing it to open and admit high pressure air to cylinder 90, causing the support frame 45 and the welding carriage to be moved into the raised position.

Contacts LS–1B open in the circuit of control relay CR–5, which causes welding contactor 107 to be deenergized, this causing the cessation of the flow of welding current.

3. The support frame 45 and the welding carriage 57 being in the raised position, the operator can now index the carriage 42 to a new position so that a new seam-welding operation can be performed. When carriage 42 is in the correct position, the operator presses foot switch FS–2 which completes the circuit to control relay CR–2, causing latter relay to become energized. Holding contacts of this relay close across switch FS–2 to maintain a closed circuit, and other contacts of this relay close in the circuits of the coils of control relays CR–6R and CR–4.

(a) The closing of contacts CR–6R in the motor circuit causes motor 44 to be connected to the 440 volt line so as to turn in the opposite, or return direction.

(b) The closing of relay CR–4 causes the normally-open solenoid valve 89 to close, shutting off the supply of high pressure air to cylinder 90, bringing about the dropping of the welding carriage 57 into the welding position. The welding discs 47 are now returned to the position in which they contact the corrugated foil.

Since motor 44 is now rotating in the opposite or "return" direction, the welding carriage 57 now starts to move in the return direction, and when it has moved a comparatively short distance, cam 91 moves away from the position below normally closed limit switch LS–1, allowing its contacts to close.

The closing of contacts LS–1B completes the circuit to control relay CR–5, causing it to be energized. Contacts CR–5 again close in the circuit of welding contactor 107, causing the welding current to flow between the welding discs 64 and the respective finger for each disc, thereby bringing about the seam-welding operation in the return direction.

Contacts LS–1A also close, these contacts being located in the circuit of control relay CR–1.

The welding carriage 57 continues moving across carriage 42 and eventually cam 92 reaches the arm of limit switch LS–2 causing the arm of this switch to raise and thereby open the normally-closed contacts of this relay.

Contacts LS–2A of switch LS–2 open to deenergize relay CR–2 whose contacts open to deenergize relays CR–6R and CR–4.

The deenergizing of CR–6R causes the contacts CR–6R to open in the motor circuit, again stopping motor 44.

The deenergizing of relay CR–4 causes the contacts CR–4 to open in the circuit of solenoid valve 89, allowing it to open and admit high pressure air to cylinder 90, causing the support frame 45 and the welding carriage to be moved into the raised position.

Contacts LS–2B open in the circuit of welding control relay CR–5, whose contacts open to deenergize welding contactor 107, and thereby bring about the cessation of the flow of welding current.

4. The welding carriage 45 again being in the raised position, the operator can now index the carriage 42 to yet another position so that a third seam-welding operation can be brought about. This operation will take place with the welding carriage 57 again moving in the forward direction. When carriage 42 is in the desired position, the operator presses foot switch FS–1 and the sequence of events as described in paragraph #2 (supra) again take place.

When it is desired to deenergize the control circuit, it is only necessary to press the stop button of switch 106, which causes the opening of the contacts of control relay CR–7.

Although a similar electrical arrangement can be used to index the support carriage 42 along rails 46, it has been found desirable, particularly when very thin foil is being seam-welded, to index this carriage by hand.

Honeycomb core is constructed in this machine as follows:

The desired number of fingers 53 are laid in a close array in the serrations 52 of the bus bars 51. A first section of corrugated foil 87 of desired length is then laid upon the fingers, with the foil resting closely upon each of the fingers. A second set of fingers 53a is then laid in the lower portions of the corrugations of foil section 87 in the general manner shown in Fig. 8. This second set of fingers is responsible for keeping the first section of foil in close contact with the fingers 53. A second section of corrugated foil 88 is then laid upon the second set of fingers 53a so as to fit closely upon these fingers. The abutting apices of these sections of foil are now ready to be welded together.

The welding is accomplished first by moving the carriage 42 to a first position below the welding carriage. This is a position in which each of the six welding discs 64 is aligned with a valley of the second foil section. The location of the carriage 42 in a position correctly aligned with the welding discs 64 of the welding carriage may be readily achieved by the use of alignment devices 97 and 98, which are located on one of the rail members 46 on either side of the welding carriage support frame 45. These devices principally consist of blocks 97a and 98a which have spaced serrations on their undersides, and operating handles by means of which the blocks can be clamped against the adjacent bus bar 51. Despite the fact that the supporting carriage 42 may be located close to one end of the rail members 46, the serrations of the block of at least one of the alignment devices can be brought into contact with some of the serrations 52 of the adjacent bus bar 51 to achieve alignment.

Upon carriage 42 being correctly placed, the welding carriage 57 is ready to be moved transversely across the carriage 42, with the welding discs 64 rolling along the lower corrugations of the uppermost section of foil. This is accomplished by first energizing the control circuit of the welding carriage (Fig. 10), which is done by pressing the start button of switch 106 located on control panel 100. The operator then presses foot switch FS–1, which brings about the operation of reversible motor 44 in the forward direction, thereby causing the welding carriage 57 to move toward the forward end of the machine. After this carriage has moved a comparatively short distance, cam 92 mounted thereon moves away from the position below the arm of normally closed limit switch LS–2, allowing the contacts of this switch to close. The closing of certain contacts of this limit switch causes the welding contactor 107 to be energized, thereby bringing about the flow of welding current between each of the welding discs 64 and the finger that is then under each disc.

Figure 9:
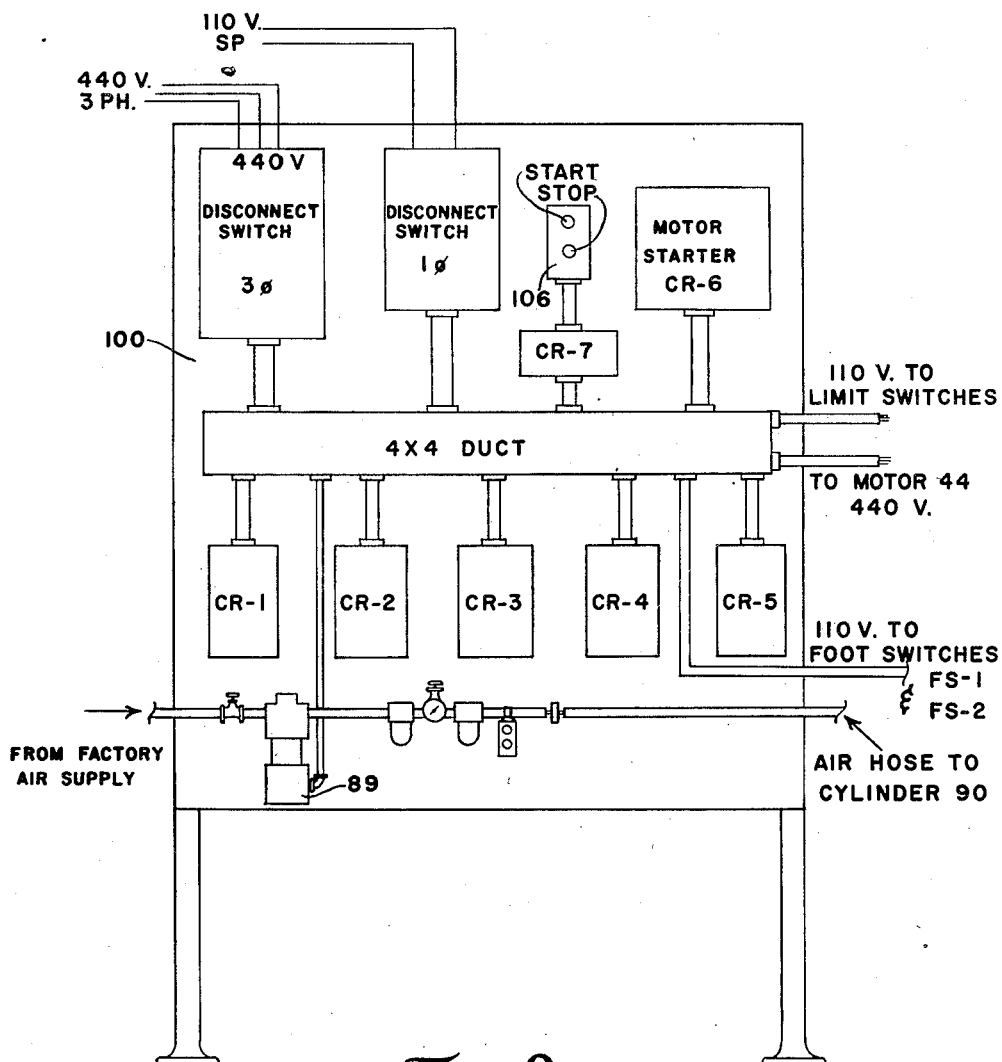
Fig. 9 is a view illustrating the arrangement of relays, switches and other components on the control panel.

After the welding discs 64 have been moved by the welding carriage completely across the uppermost section of corrugated foil to seam-weld abutting apices of the two sections of foil supported by fingers 53, cam 91 of the welding carriage reaches arm 101 of limit switch LS–1, causing this normally closed switch to open and thereby to bring about the deenergizing of motor 44 and the welding contactor 107. This also causes the normally open solenoid 89 (Fig. 9) to be deenergized, thereby allowing it to open and admit high pressure air to cylinder 90. Latter occurrence causes the piston 74 of the cylinder to raise, thereby causing the support frame 45 and the welding carriage to be moved into the raised position.

The raising of the welding carriage and support frame allows the carriage 42 to be indexed to a new position without interference from the welding discs 64. That the carriage may be correctly aligned with respect to the welding carriage, the alignment devices 97 and/or 98 are first released and then reapplied when the carriage 42 is in the desired new position, in order that precise alignment of the valleys of the foil sections with welding discs 64 can be achieved. It is worthy of note at this point that the carriage 42 is to be indexed a distance corresponding to twelve corrugations, inasmuch as six corrugations are seam-welded during each operation of the welding carriage 57, and only alternate corrugations are welded due to the spacing of the welding discs 64.

Upon the carriage 42 now being correctly aligned, the welding carriage 57 is to be moved in the opposite or return direction that a second set of six abutting apices can be seam-welded together. This is accomplished by pressing the foot switch FS–2, which not only connects the motor 44 so that it operates in the reverse direction, but also causes the solenoid valve 89 to cut off the supply of high pressure air to cylinder 90, thereby allowing the air in cylinder 90 to be vented to the atmosphere to permit the welding carriage 57 to descend into the welding position. After the carriage 57 has moved a comparatively short distance in the return direction, the cam 91 moves away from the position beneath the arm of normally closed limit switch LS–1, allowing its contacts to close and bring about the energizing of welding contactor 107. The carriage continues the return movement across the corrugated foil sections until cam 92 reaches LS–2, which is thereby opened to stop the motor 44 and the welding current, and to bring about the raising of support frame 45. The carriage 42 then can be indexed to a third position, and the welding carriage again operated, now in the forward direction. These operations are continued until the alternate abutting apices have been welded together through the entire length of the corrugated foil sections. The carriage 42 is then selectively moved in the return direction so that the abutting apices that were skipped when the carriage 42 was moved in the first direction can now be welded. As previously described, additional sections of foil can be added to the core formed by sections 87 and 88 by using each set of fingers alternately as the lower set and as the upper set of fingers. First, one set is used as the lower electrodes as well as the supporting means, while the other set of fingers is being used as the means for aligning the section of foil being added. Then, when a new section of core is to be added, the lower fingers are removed from the position resting in the serrations, and are used for aligning the new section of foil.

It is to be understood that the foregoing detailed description and the accompanying drawings are illustrative and that the combination and improvements herein disclosed may be embodied in various other ways without departing from the invention defined by the claims.

What is claimed is:

1. The method of making seam-welded honeycomb core comprising the steps of placing a section of corrugated metal foil on a set of spaced, substantially horizontally disposed fingers of electrically conductive material, so that the lower portions of the corrugations extend down between the fingers while the upper portions of the corrugations rest upon the fingers, placing a second set of fingers in the lower portions of said section, placing a second section of corrugated metal foil on said second set of fingers so that the lower portions of said second section are in alignment with and contacting the upper portions of the first-mentioned section, placing an electrode in at least one lower portion of said second section of foil at a location directly above at least one of the fingers of the first-mentioned set, moving said electrode along said lower portion substantially in alignment with the longitudinal axis of the respective finger of said first-mentioned set while passing electric current between said electrode and said finger through both sections of foil whereby to seam-weld abutting portions of said first and second sections together.

2. The method of making seam-welded honeycomb core comprising the steps of placing a section of corrugated metal foil on a set of spaced, substantially horizontally disposed fingers of electrically conductive material, so that the lower portions of the corrugations extend down between the fingers while the upper portions of the corrugations rest upon the fingers, placing a second set of fingers of electrically conductive material in the lower portions of said section, placing a second section of corrugated metal foil on said second set of fingers so that the lower portions of said second section are in alignment with and contacting the upper portions of the first-mentioned section, placing an electrode in at least one lower portion of said second section of foil at a location directly above at least one of the fingers of the first-mentioned set, moving said electrode along said lower portion substantially in alignment with the longitudinal axis of the respective finger of said first-mentioned set while passing electric current between said electrode and said finger through both sections of foil whereby to seam-weld abutting portions of said first and second sections together, successively moving said electrode along each of the remaining lower portions of said second section, substantially in alignment with the longitudinal axis of a respective finger, to seam-weld said first and second sections together at each location where the upper portions of said first-mentioned section and the lower portions of said second section abut, whereby to secure said sections together so as to form a series of cells between said first and second sections, removing said first-mentioned set of fingers from below said first-mentioned section of foil and placing them on the lower portions of said second section, placing a third section of corrugated metal foil on the fingers of said first-mentioned set so that the lower portions of the corrugations of said third section of foil are aligned with and contacting the upper portions of the corrugations of said second section of foil, successively moving said electrode along each of the lower portions of said third section of foil while passing an electric current between said terminal and said second set of fingers to weld said second and third sections of foil together so as to form a series of cells therebetween, removing said second set of fingers from below said second section of foil and placing them on the lower portions of said third section, placing a fourth section of corrugated metal foil on the fingers of said second form so that the lower portions of the corrugations of said fourth section rest upon the upper portions of the corrugations of said third section of foil, welding said third and fourth sections together so as to form a series of cells therebetween, and continuing to build up said core in thickness by welding on additional sections of corrugated foil to create additional series of cells.

3. A seam-welding machine for making honeycomb core material from a plurality of corrugated foil sections comprising a movable supporting carriage and a welding carriage movable above said supporting carriage in a direction transverse to the direction in which said supporting carriage moves, and in a plane substantially parallel to the plane in which said supporting carriage operates, said supporting carriage having a plurality of aligned, spaced serrations in a transverse arrangement across the upper portion thereof, each of said serrations being adapted to receive an elongated finger of electrically conductive material, a plurality of said fingers, when placed in a closely spaced parallel arrangement in said serrations, forming a support for a first section of corrugated foil, said welding carriage being movable in a direction substantially parallel to the longitudinal axes of said fingers and having a plurality of welding electrodes, each of said electrodes, when fingers of said supporting carriage have been moved into alignment therewith, being adapted to move along a corrugation of a second corrugated foil section whose lower corrugations are aligned with and abutting the upper corrugations of said first foil section, means connecting each of said electrodes and its respective finger to respective output terminals of a source of electric current having a pair of output terminals, whereby electric current is caused to flow between each electrode and its respective finger, through both sections of foil resting on said supporting carriage, to seam-weld together the abutting corrugations resting below each electrode to form a series of symmetrical cells between said foil sections.

4. A seam-welding machine for making honeycomb core material from a plurality of corrugated foil sections comprising a movable supporting carriage and a welding carriage movable above said supporting carriage in a direction transverse to the direction in which said supporting carriage moves, and in a plane substantially parallel to the plane in which said supporting carriage operates, said supporting carriage having two spaced, longitudinally disposed bus bars on its upper portion, each of said bus bars having a plurality of spaced serrations therein, with the serrations of one bus bar aligned with the serrations of the other bus bar, each set of two aligned serrations being adapted to receive an elongated finger of electrically conductive material, a plurality of fingers, when placed in a closely spaced parallel arrangement across said bus bars, forming a support for corrugated foil, said welding carriage being movable in a direction substantially parallel to the longitudinal axes of said fingers and having a plurality of welding electrodes, each of said electrodes, when fingers of said supporting carriage have been moved into alignment therewith, being adapted to move across said supporting carriage so as to seam-weld together the abutting apices of two sections of corrugated foil supported by said fingers, means connecting each of said electrodes and its respective finger to respective output terminals of a source of electric current having a pair of output terminals, whereby electric current is caused to flow between each electrode and its respective finger, through both sections of foil resting on said fingers, to seam-weld the crests of the lower section to the valleys of the upper section to form a series of symmetrical cells between said foil sections.

5. A seam-welding machine for making honeycomb core material from a plurality of corrugated foil sections comprising a movable supporting carriage and a welding carriage movable above said supporting carriage in a direction transverse to the direction in which said supporting carriage moves, and in a plane substantially parallel to the plane in which said supporting carriage operates, said supporting carriage having two spaced, longitudinally disposed bus bars on its upper portion, each of said bus bars having a plurality of spaced serrations therein, with the serrations of one bus bar aligned with the serrations of the other bus bar, each set of two aligned serrations being adapted to receive an elongated, removable finger of electrically conductive material, a plurality of fingers, when placed in a closely spaced parallel arrangement across said bus bars, forming a support for corrugated foil, said welding carriage being movable in a direction substantially parallel to the longitudinal axes of said fingers and having a plurality of welding electrodes, each of said electrodes, when fingers of said supporting carriage have been moved into alignment therewith, being adapted to move across said supporting carriage so as to seam-weld together the abutting apices of two sections of corrugated foil supported by said fingers, means connecting each of said electrodes and its respective finger to respective output terminals of a source of electric current having a pair of output terminals, whereby electric current is caused to flow between each electrode and its respective finger, through both sections of foil resting on said fingers, to seam-weld the crests of the lower section to the valleys of the upper section to form a series of symmetrical cells between said foil sections, said core, as additional sections of corrugated foil are welded thereto, being built up below said fingers, and being supported thereby between said bus bars.

6. A seam-welding machine for making honeycomb core material from a plurality of corrugated foil sections comprising a set of spaced fingers for supporting corrugated foil, and a welding carriage movable in a plane adjacent the plane of said fingers and in a direction substantially parallel to the longitudinal axes of said fingers, said carriage having a plurality of welding electrodes adapted to move along said fingers so as to seam-weld together the abutting apices of two sections of corrugated foil supported by said fingers, means connecting each of said electrodes and its respective finger to respective output terminals of a source of electric current having a pair of output terminals, whereby electric current is caused to flow between each electrode and its respective finger, through both sections of foil resting on said fingers, to seam-weld together the abutting corrugations resting below each electrode to form a series of symmetrical cells between said foil sections.

7. A seam-welding machine for making honeycomb core material from a plurality of corrugated foil sections comprising a set of spaced fingers for supporting corrugated foil, and a welding carriage movable in a plane adjacent the plane of said fingers and in a direction substantially parallel to the longitudinal axes of said fingers, said carriage having a plurality of welding electrodes adapted to move along said fingers so as to seam-weld together the abutting apices of two sections of corrugated foil supported by said fingers, means for securing the lower of the two sections against said fingers so that the lower portions of the corrugations extend down between the fingers while the upper portions of the corrugations rest upon the fingers, means connecting each of said electrodes and its respective finger to respective output terminals of a source of electric current having a pair of output terminals, whereby electric current is caused to flow between each electrode and its respective finger, through both sections of foil resting on said fingers to seam-weld together the abutting corrugations resting below each electrode to form a series of symmetrical cells between said foil sections.

References Cited in the file of this patent

UNITED STATES PATENTS

| | | |
|---|---|---|
| 2,065,546 | Young et al. | Dec. 29, 1936 |
| 2,163,590 | Ganahl et al. | June 27, 1939 |

FOREIGN PATENTS

| | | |
|---|---|---|
| 825,327 | France | Dec. 8, 1937 |